(12) United States Patent
Park et al.

(10) Patent No.: US 11,292,239 B2
(45) Date of Patent: Apr. 5, 2022

(54) DISASSEMBLING METHOD OF DISPLAY MODULE AND REMANUFACTURING METHOD OF DISASSEMBLED DISPLAY MODULE

(71) Applicant: Samsung Display Co., Ltd., Yongin-si (KR)

(72) Inventors: Se Hun Park, Cheonan-si (KR); Chang-Mo Park, Seoul (KR); Jong Man Bae, Hwaseong-si (KR); So Yeon Joo, Yongin-si (KR)

(73) Assignee: SAMSUNG DISPLAY CO., LTD., Gyeonggi-Do (KR)

(*) Notice: Subject to any disclaimer, the term of this patent is extended or adjusted under 35 U.S.C. 154(b) by 3 days.

(21) Appl. No.: 16/599,204

(22) Filed: Oct. 11, 2019

(65) Prior Publication Data

US 2020/0139692 A1     May 7, 2020

(30) Foreign Application Priority Data

Nov. 7, 2018    (KR) ........................ 10-2018-0136006

(51) Int. Cl.
    *B32B 43/00*        (2006.01)
    *B32B 38/10*        (2006.01)

(52) U.S. Cl.
    CPC ............ *B32B 43/006* (2013.01); *B32B 38/10* (2013.01); *Y10S 156/924* (2013.01); *Y10S 156/937* (2013.01); *Y10T 156/1153* (2015.01); *Y10T 156/1168* (2015.01); *Y10T 156/1911* (2015.01)

(58) Field of Classification Search
CPC . B32B 38/10; B32B 43/006; Y10T 156/1168; Y10T 156/1911; Y10T 156/924; Y10T 156/937

See application file for complete search history.

(56) References Cited

U.S. PATENT DOCUMENTS

| 8,801,881 | B2 | 8/2014 | Nonaka et al. |
| 2011/0043981 | A1* | 2/2011 | Johnson ............ G02F 1/133308 361/679.01 |
| 2013/0240116 | A1* | 9/2013 | Nonaka .............. B29D 11/0073 156/64 |

(Continued)

FOREIGN PATENT DOCUMENTS

| KR | 1020140122933 A | 10/2014 |
| KR | 101628435 A | 6/2016 |
| KR | 1020170059064 A | 5/2017 |

*Primary Examiner* — Mark A Osele
*Assistant Examiner* — Nickolas R Harm
(74) *Attorney, Agent, or Firm* — Cantor Colburn LLP (57) ABSTRACT

A disassembling method of a display module includes attaching an auxiliary sheet to a display module by using an adhesive tape, the display module including a display panel attached to a window by an adhesive layer, and the auxiliary sheet attached to the display module including an external force applying portion exposed outside an outer edge of the display module; cooling the display module and the auxiliary sheet attached thereto by the adhesive tape; and after the cooling of the display module and the auxiliary sheet attached thereto, separating the display panel and the window from each other by applying force to the external force applying portion of the auxiliary sheet attached to the display module.

20 Claims, 9 Drawing Sheets

(56) References Cited

U.S. PATENT DOCUMENTS

| | | | |
|---|---|---|---|
| 2015/0000823 A1* | 1/2015 | Kim | B32B 17/064 |
| | | | 156/80 |
| 2015/0140889 A1* | 5/2015 | Lee | G02F 1/1303 |
| | | | 445/24 |
| 2016/0318296 A1* | 11/2016 | Park | B32B 43/006 |
| 2019/0210351 A1* | 7/2019 | Bae | B32B 43/006 |

* cited by examiner

DISASSEMBLING METHOD OF DISPLAY MODULE AND REMANUFACTURING METHOD OF DISASSEMBLED DISPLAY MODULE

This application claims priority to Korean Patent Application No. 10-2018-0136006 filed on Nov. 7, 2018, and all the benefits accruing therefrom under 35 U.S.C. § 119, the entire contents of which are incorporated herein by reference.

BACKGROUND

(a) Field

This disclosure relates to a disassembling method of a display module and a remanufacturing method of the display module which has been disassembled.

(b) Description of the Related Art

A display device includes a display module that includes a display panel for displaying an image and a window for protecting the display panel. The display module is manufactured such as by attaching the display panel to the window with an adhesive layer.

A display device having a minimal bezel at a top and a bottom of the display panel as well as at left and right sides thereof has been developed. In this case, a planar size of the window and a planar size of the display panel are very similar.

When the display panel or the window of the display module is defective, the defective component is replaced.

SUMMARY

The invention provides a disassembling method of a display module in which a display panel and a window may be relatively easily separated from each other.

In addition, the invention provides a remanufacturing method of a display module in which a display panel and a window are relatively easily separated from each other and then a new display panel or a new window is respectively attached to the separated window or the separated display panel.

An embodiment of the invention provides a disassembling method of a display module, including: attaching an auxiliary sheet to a display module by using an adhesive tape, the display module including a display panel attached to a window by an adhesive layer, and the auxiliary sheet attached to the display module including an external force applying portion exposed outside an outer edge of the display module; cooling the display module having the auxiliary sheet attached thereto; and after the cooling of the display module having the auxiliary sheet attached thereto, separating the display panel and the window from each other by applying force to the external force applying portion of the auxiliary sheet attached to the display module.

In the cooling of the display module having the auxiliary sheet attached thereto, the adhesive tape and the adhesive layer may each be cooled to a temperature of about −80 degrees Celsius to about −120 degrees Celsius.

A bonding force of the adhesive tape at the temperature of about −80 degrees Celsius to about −120 degrees Celsius may be stronger than a bonding force of the adhesive layer at the temperature of about −80 degrees Celsius to about −120 degrees Celsius.

The attaching of the auxiliary sheet to the display module may include attaching the auxiliary sheet to the window by using the adhesive tape.

A planar area of the auxiliary sheet may be larger than a planar area of the window.

In the separating of the display panel and the window from each other, the adhesive layer may remain attached to the display panel.

The attaching of the auxiliary sheet to the display module may include attaching the auxiliary sheet to the display panel by using the adhesive tape.

A planar area of the auxiliary sheet may be larger than a planar of the display panel.

In the separating of the display panel and the window, the adhesive layer may remain attached to the window.

Another embodiment of the invention provides a remanufacturing method of a display module, including: providing the display module by attaching a display panel to a window by an adhesive layer; attaching an auxiliary sheet to the display panel or the window of the display module, by using an adhesive tape, the auxiliary sheet attached to the display module including an external force applying portion exposed outside an outer edge of the display module; cooling the display module having the auxiliary sheet attached thereto; after the cooling of the display module having the auxiliary sheet attached thereto, separating the display panel and the window from each other by applying force to the external force applying portion of the auxiliary sheet attached to the display panel or the window; and removing the adhesive layer from one of the display panel and the window to which the auxiliary sheet is not attached. A remanufactured display module includes the display panel or the window to which the auxiliary sheet is attached.

In the removing of the adhesive layer, the adhesive layer which remains attached to the display panel may be removed therefrom. The method may further include after the removing of the adhesive layer from the display panel, attaching a new window to the display panel from which the adhesive layer is removed, by using a new adhesive layer.

In the removing of the adhesive layer, the adhesive layer which remains attached to the window may be removed therefrom. The method may further include after the removing of the adhesive layer from the window, attaching a new display panel to the window from which the adhesive layer is removed, by using a new adhesive layer.

According to one or more of the embodiments, a display panel and a window may be relatively easily separated from each other.

In addition, according to one or more of the embodiments, a display panel and a window may be relatively easily separated, and a new display panel or a new window may be respectively attached to the separated window or the separated display panel.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

The invention will be described more fully hereinafter with reference to the accompanying drawings, in which exemplary embodiments of the invention are shown. As those skilled in the art would realize, the described embodiments may be modified in various different ways, all without departing from the spirit or scope of the present disclosure.

Parts that are irrelevant to the description will be omitted to clearly describe the present disclosure, and like reference numerals designate like elements throughout the specification.

Further, in the drawings, the size and thickness of each element are arbitrarily illustrated for ease of description, and the present disclosure is not necessarily limited to those illustrated in the drawings. In the drawings, the thicknesses of layers, films, panels, regions, etc., are exaggerated for clarity. In the drawings, for ease of description, the thicknesses of some layers and areas are exaggerated.

It will be understood that when an element such as a layer, film, region, or substrate is referred to as being related to another element such as being "on" another element, it can be directly on the other element or intervening elements may also be present. In contrast, when an element is referred to as being related to another element such as being "directly on" another element, there are no intervening elements present. Further, in the specification, the word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. In addition, unless explicitly described to the contrary, the word "comprise" and variations such as "comprises" or "comprising" will be understood to imply the inclusion of stated elements but not the exclusion of any other elements.

Further, throughout the specification, the phrase "on a plane" means viewing a target portion from the top, and the phrase "on a cross-section" means viewing a cross-section formed by vertically cutting a target portion from the side.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

When a display panel or a window of a display module for a display device is defective, the display module is disassembled into separate components of the display panel and the window. To replace the defective component, a new display panel or a new window is bonded to a remaining (non-defective) component of the display module to re-manufacture the display module.

For a display device having a minimal bezel dimension at top, bottom, left and right sides of the display panel in a top plan view, a planar size of the window and a planar size of the display panel are very similar. Where a planar size of the window is substantially the same as a planar size of the display panel, separation of the window and the display panel from each other may be difficult in a process of replacing a defective component of the display module.

Figure 1:
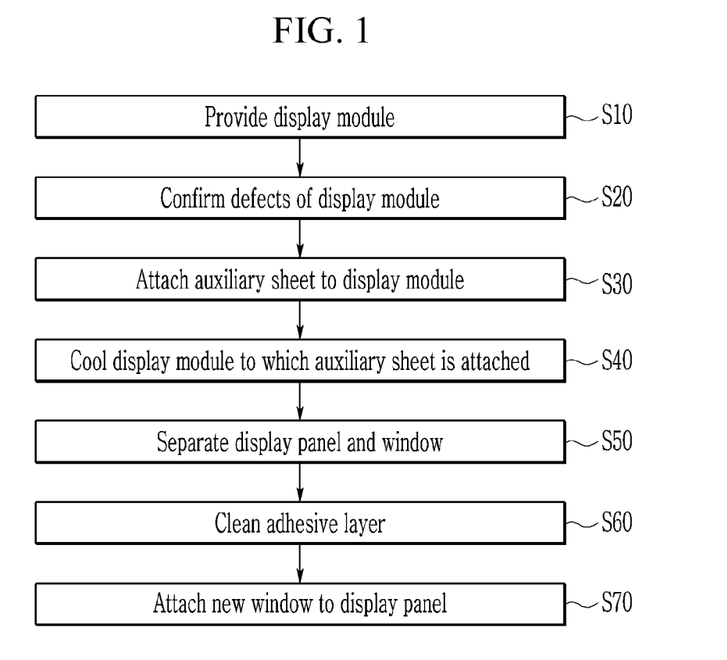
FIG. 1 schematically illustrates a flowchart of an embodiment of a disassembling and remanufacturing method of a display module.

FIG. 1 illustrates a flowchart of an embodiment of a disassembling and remanufacturing method of a display module of a display device.

Referring to FIG. 1, a disassembling and remanufacturing method of a display module includes providing a display module (S10), confirming a defect of the display module (S20), attaching an auxiliary sheet to the display module (S30), and cooling the display module having the auxiliary sheet attached thereto (S40). In addition, the disassembling and manufacturing method of the display module includes separating the display panel and the window of the display module from each other (S50), cleaning an adhesive layer (S60), and attaching a new window to the display panel (S70).

In the providing of the display module (S10), the display panel and the window are attached to each other, such as by using an adhesive layer.

The display panel displays an image, and may include a plurality of transistors, a plurality of light-emitting members such as light emitting diodes, and a plurality of signal-transmitting wires connected to the transistors and the light emitting diodes. Each of the aforementioned components may be disposed on or in a substrate of the display panel. Alternatively, a substrate on or in which a plurality of transistors, a plurality of pixel electrodes, and a plurality of signal-transmitting wires connected thereto are disposed, a substrate on or in which a plurality of color filters and a common electrode are disposed, and a light-transmittance control layer such as a liquid crystal layer interposed between the two substrates, may be included in the display panel.

The window protects the display panel which displays the image. The window may include glass or plastic. The window may form an outermost surface of the display panel. The window may be disposed at a viewing side of the display module, such as on a display surface of the display panel.

In the confirming of the defect of the display module (S20), presence or absence of a defect of the display panel or the window is determined and confirmed. The display panel and the window may together form a stacked structure of the display module.

In the attaching of the auxiliary sheet to the display module (S30), the auxiliary sheet is attached to the display panel and the window of the display module, such as using an adhesive tape. The auxiliary sheet is attached to the display module at a component thereof (e.g., the display panel or the window) at which the defect is confirmed. In an embodiment, for example, if it is confirmed that the window of the display module is defective as including the defect, the auxiliary sheet is attached to the window. A planar area of the auxiliary sheet is larger than a planar area of the window. The auxiliary sheet includes an external force applying portion by which external force is applicable to the display module. The auxiliary sheet may include a metal material.

In the cooling of the display module having the auxiliary sheet attached thereto (S40), the display module and the auxiliary sheet attached thereto are cooled to a temperature of about −80 degrees Celsius to about −120 degrees Celsius. The cooling of the display module having the auxiliary sheet attached thereto cools at least the adhesive layer and the adhesive tape to a temperature of about −80 degrees Celsius to about −120 degrees Celsius. The cooling of the display module and the auxiliary sheet attached thereto, may cool each of the display panel, the window, the adhesive layer, the adhesive tape and the auxiliary sheet to a temperature of about −80 degrees Celsius to about −120 degrees Celsius With the cooling of the display module, a bonding force of the adhesive layer bonding the display panel and the window to each other is reduced. However, a bonding force of the adhesive tape bonding the window and the auxiliary sheet to each other is not reduced. That is, at the temperature of about −80 degrees Celsius to about −120 degrees Celsius, the bonding force of the adhesive tape bonding the window and the auxiliary sheet to each other is stronger than the bonding force of the adhesive layer bonding the display panel and the window to each other.

In the separating of the display panel and the window (S50), external force is applied to the external force applying portion of the auxiliary sheet to separate the display panel and the window of the display module from each other. At the temperature of about −80 degrees Celsius to about −120 degrees Celsius, the bonding force of the adhesive tape bonding the window and the auxiliary sheet to each other is stronger than the bonding force of the adhesive layer bonding the display panel and the window to each other, so that the window and the display panel are separable from each other. The adhesive layer with which the display panel and the window are bonded to each other remains attached to the display panel, and the window is separated from both the adhesive layer and the display panel attached thereto.

As described above, in one or more embodiment of disassembling and remanufacturing method of a display module, the display module may be relatively easily disassembled into separate components of the display panel and the window by using the auxiliary sheet including the external force applying portion by which external force is applicable to the display module.

In the cleaning of the adhesive layer (S60), the adhesive layer remaining attached to the display panel is removed from the display panel.

In the attaching of the display panel and the new window (S70), a new window without defects is attached to the display panel from which the adhesive layer is removed, using a new adhesive layer.

Therefore, the defective window can be separated from the display panel and the new window can be attached to the display panel by one or more embodiment of the disassembling and remanufacturing method of the display module.

The display module and components thereof, may be disposed in a plane defined by a first direction and a second direction which cross each other. A thickness of the display module and components thereof is extended along a third direction which crosses each of the first direction and the second direction.

Embodiments of a disassembling and remanufacturing method of a display module will be described with reference to FIG. 2 to FIG. 8.

FIG. 2 to FIG. 6 illustrates an embodiment of a disassembling and remanufacturing method of a display module.

Figure 2:
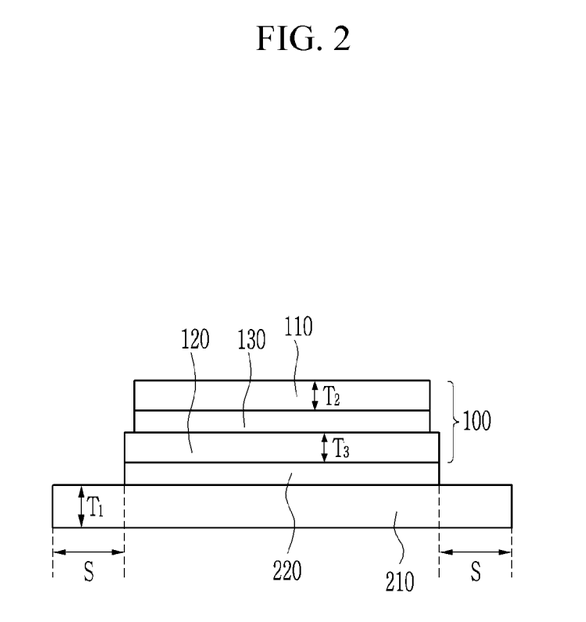
FIG. 2 to FIG. 6 illustrates an embodiment of a disassembling and remanufacturing method of a display module.
Figure 3:
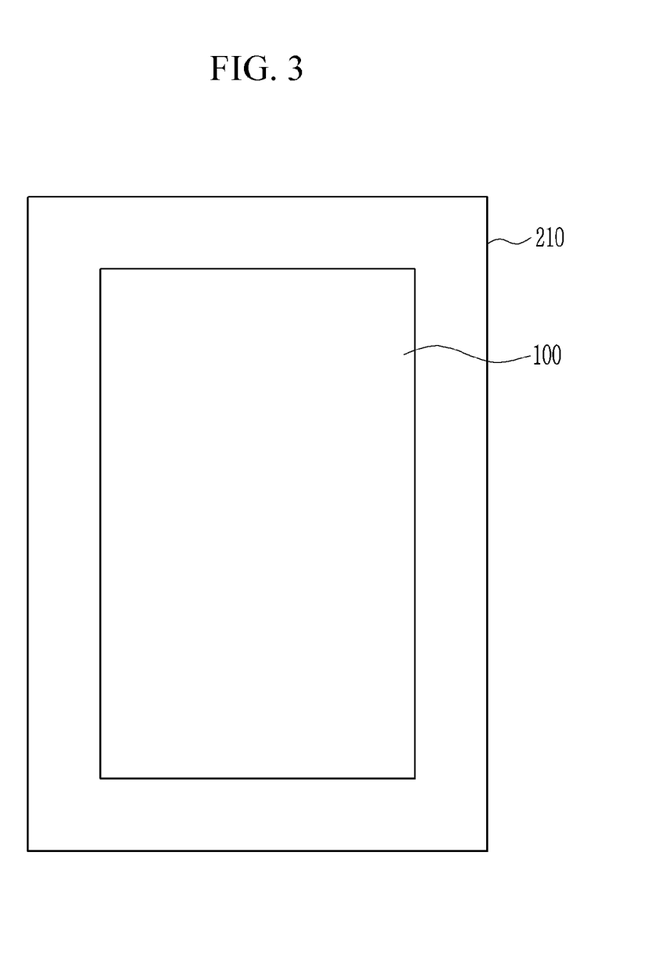

Referring to FIG. 2 and FIG. 3, a display module 100 is provided. When the display module 100 is found to be defective, an auxiliary sheet 210 is attached to the display module 100 such as being adhered thereto.

The display module 100 includes a display panel 110, a window 120, and an adhesive layer 130. The display module 100 is provided by bonding the display panel 110 and the window 120 to each other with the adhesive layer 130.

The display panel 110 displays an image, and may include a plurality of transistors, a plurality of light-emitting members such as light emitting diodes, and a plurality of signal-transmitting wires connected to the transistors and the light emitting diodes. Each of the aforementioned components may be disposed on or in a substrate of the display panel 110. Alternatively, a substrate on or in which a plurality of transistors, a plurality of pixel electrodes, and a plurality of signal-transmitting wires connected thereto are disposed, a substrate on or in which a plurality of color filters and a common electrode are disposed, and a light-transmittance control layer such as a liquid crystal layer interposed between the two substrates, may be included in the display panel 110.

The window 120 protects the display panel 110 which displays an image. The window 120 may include glass or plastic. A planar area of the window 120 is substantially similar to a planar area of the display panel 110. That is, a distance between corresponding outer edges of the window 120 and the display panel 110, taken along the window 120 or the display panel 110, may be relatively small. In the cross-sectional view shown in FIG. 2, corresponding outer edges of the window 120 and the display panel 110 are separated from each other along the horizontal direction which may represent a first direction and/or a second direction which crosses the first direction.

The adhesive layer 130 may include one of an optically clear adhesive ("OCA"), an optically clear resin ("OCR"), and a pressure sensitive adhesive ("PSA").

After determining that the display module 100 is defective, the auxiliary sheet 210 is attached to a component of the display module 100 at which the defect occurs, such as the display panel 110 or the window 120 of the display module 100. As illustrated in FIG. 2, for example, a defect has been confirmed in the window 120, such that the auxiliary sheet 210 is attached to the window 120. An adhesive tape 220 is used to attach the auxiliary sheet 210 to the window 120.

The auxiliary sheet 210 may include a metal material, and a planar area of the auxiliary sheet 210 is larger than a planar area of the window 120. A thickness T1 of the auxiliary sheet 210 is greater than each of a thickness T2 of the display panel 110 and a thickness T3 of the window 120. The auxiliary sheet 210 includes an external force applying portion S with which an external force is applicable to the display module 100, such as at the window 120. The external force applying portion S is a portion of the auxiliary sheet 210 that does not overlap the window 120. That is, the external force applying portion S of the auxiliary sheet 210 is exposed outside outer edges of the window 120. As shown in FIG. 3, the external force applying portion S of the auxiliary sheet 210 is exposed outside an outer edge of the display module 100. While FIG. 3 shows the external force applying portion S of the auxiliary sheet 210 is exposed outside of the display module 100, at each outer edge of the display module 100, the invention is not limited thereto or thereby. The external force applying portion S of the auxiliary sheet 210 is disposed between corresponding outer edges of the display module 100 and the auxiliary sheet 210.

Figure 4:
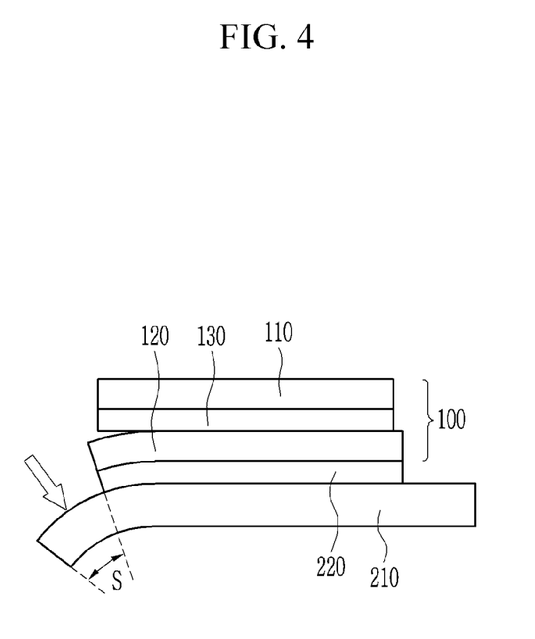
Figure 5:
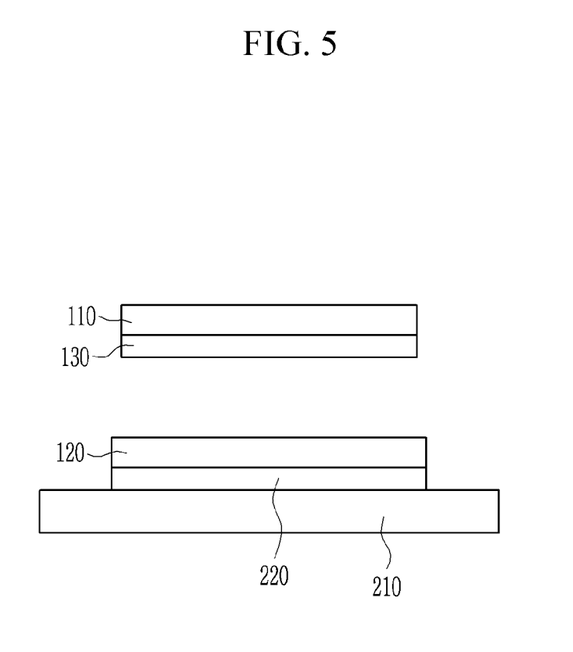

Referring to FIG. 4 and FIG. 5, after the display module 100 having the auxiliary sheet 210 thereto is cooled, the display panel 110 and the window 120 are separated from each other.

The display module 100 having the auxiliary sheet 210 attached thereto is cooled to the temperature of about −80 degrees Celsius to about −120 degrees Celsius. When the display module 100 having the auxiliary sheet 210 attached thereto is cooled, a bonding force of the adhesive layer 130 bonding the display panel 110 and the window 120 to each other is reduced. However, a bonding force of the adhesive tape 220 bonding the window 120 and the auxiliary sheet 210 to each other is not reduced. That is, at the temperature of about −80 degrees Celsius to about −120 degrees Celsius, the bonding force of the adhesive tape 220 is stronger than the bonding force the adhesive layer 130.

In separating the display panel 110 and the window 120 from each other, external force is applied to the external force applying portion S of the auxiliary sheet 210 as indicated by the arrow in FIG. 2, to separate the display panel 110 and the window 120. The external force may be in a direction away from the display panel 110 and the adhesive layer 130, as shown in FIG. 2.

Since the bonding force of the adhesive tape 220 at the temperature of about −80 degrees Celsius to about −120 degrees Celsius is stronger than the bonding force of the adhesive layer 130 at the temperature of about −80 degrees Celsius to about −120 degrees Celsius, when the external force is applied to the external force applying portion S of the auxiliary sheet 210, the window 120 and the display panel 110 are separated from each other at an interface between the window 120 and the adhesive layer 130. In the application of the external force at the external force applying portion S of the auxiliary sheet 210, the adhesive layer 130 and the window 120 are gradually separated from each other at portions thereof adjacent to the external force applying portion S of the auxiliary sheet 210. Thus, the adhesive layer 130 remains attached to the display panel 110, and the window 120 to which the auxiliary sheet 210 is attached is separated from the display panel 110 having the adhesive layer 130 attached thereto.

Since the planar area of the window 120 is substantially similar to the planar area of the display panel 110, there is essentially no planar area of the window 120 at which external force can be applied to separate the window 120 from the display panel 110. Thus, separation of the window 120 from the display panel 110 by directly applying force to the window 120 may be difficult. However, in one or more embodiment of a disassembling and remanufacturing method of a display module, the defective window 120 may be separated from the display panel 110 by using the auxiliary sheet 210 which can apply the external force to the window 120. Accordingly, the display module 100 may be disassembled into the separated components of the display panel 110 and the window 120.

Figure 6:
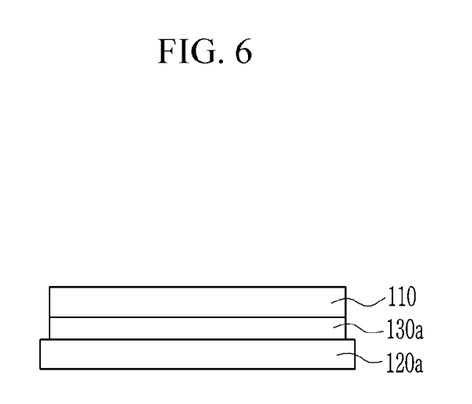

Referring to FIG. 6, the adhesive layer 130 remaining attached to the display panel 110 is removed such as by a cleaning process. The removal of the adhesive layer 130 may expose an outer surface of the display panel 110 at which a non-defective window may be attachable. As shown in FIG. 6, the display panel 110 and a new window 120a different from the window 120 are attached to each other with a new adhesive layer 130a different from the adhesive layer 130.

As described above, the window 120 which is defective can be separated from the display panel 110 and the new window 120a can be attached to the display panel 110 by one or more embodiment of the disassembling and remanufacturing method of the display module.

In another embodiment of a disassembling and remanufacturing method of the display module, the auxiliary sheet 210 may be attached to the display panel 110 to separate the display panel 110 and the window 120 from each other. This will be described with reference to FIG. 7 to FIG. 9.

Figure 7:
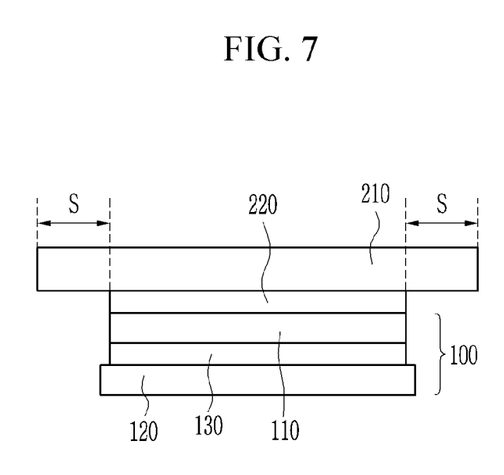
FIG. 7 to FIG. 9 illustrates another embodiment of a disassembling and remanufacturing method of a display module.
Figure 8:
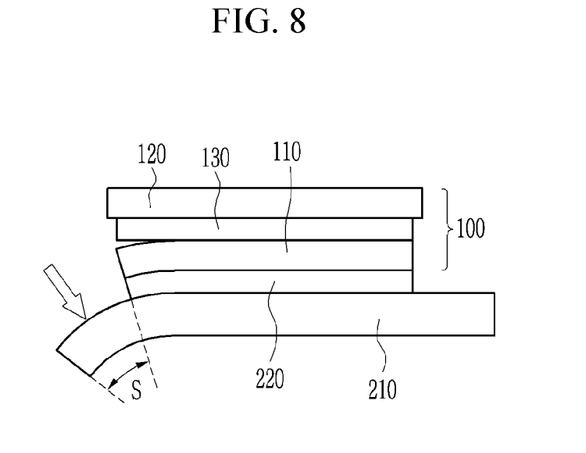
Figure 9:
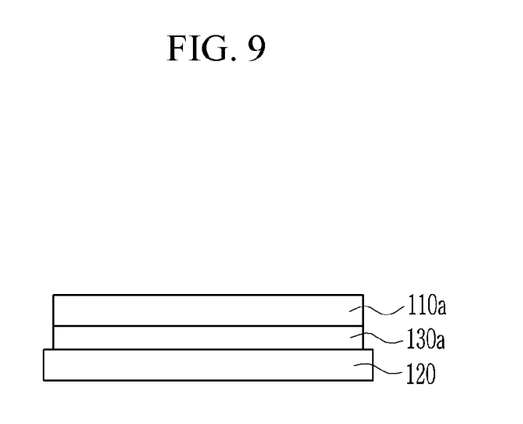

FIG. 7 to FIG. 9 illustrates views of another embodiment of a disassembling and remanufacturing method of a display module.

Referring to FIG. 7, the display module 100 is provided. When the display module 100 is found to be defective, the auxiliary sheet 210 is attached to the display module 100.

The display module 100 includes the display panel 110, the window 120, and the adhesive layer 130. The display module 100 is provided by bonding the display panel 110 and the window 120 to each other with the adhesive layer 130. The planar area of the window 120 is substantially similar to the planar area of the display panel 110.

After the defect of the display module 100 is confirmed, the auxiliary sheet 210 is attached to the display panel 110 or the window 120 in which the defects occur. As illustrated in FIG. 7, for example, a defect has occurred in the display panel 110, so the auxiliary sheet 210 is attached to the display panel 110. The adhesive tape 220 is used to attach the auxiliary sheet 210 to the display panel 110 in which the defect is confirmed.

The auxiliary sheet 210 may include a metal material, and the planar area of the auxiliary sheet 210 is larger than the planar area of the display panel 110. The auxiliary sheet 210 includes the external force applying portion S at which an external force is applicable to the display module 100. The external force applying portion S is a portion of the auxiliary sheet 210 that does not overlap the display panel 110.

Referring to FIG. 8, after the display module 100 having the auxiliary sheet 210 attached thereto is cooled, the display panel 110 and the window 120 are separated from each other.

The display module 100 having the auxiliary sheet 210 attached thereto is cooled to the temperature of about −80 degrees Celsius to about −120 degrees Celsius. When the display module 100 having the auxiliary sheet 210 attached thereto is cooled, the bonding force of the adhesive layer 130 bonding the display panel 110 and the window 120 to each other is reduced. However, the bonding force of the adhesive tape 220 bonding the display module 100 and the auxiliary sheet 210 to each other is not reduced. That is, at the temperature of about −80 degrees Celsius to about −120 degrees Celsius, the bonding force of the adhesive tape 220 is stronger than the bonding force of the adhesive layer 130.

When external force is applied to the external force applying portion S of the auxiliary sheet 210 attached to the display panel 110, the display panel 110 and the window 120 are separated from each other.

Since the bonding force of the adhesive tape 220 at the temperature of about −80 degrees Celsius to about −120 degrees Celsius is stronger than the bonding force of the adhesive layer 130 at the temperature of about −80 degrees Celsius to about −120 degrees Celsius, when the external force is applied to the external force applying portion S of the auxiliary sheet 210, the window 120 and the display panel 110 are separated from each other. The adhesive layer 130 and the display panel 110 are gradually separated from each other at portions thereof adjacent to the external force applying portion S of the auxiliary sheet 210. Thus, the adhesive layer 130 remains attached to the window 120, and the display panel 110 to which the auxiliary sheet 210 is attached is separated from the window 120 having the adhesive layer 130 attached thereto.

Since the planar area of the display panel 110 is substantially similar to the planar area of the window 120, there is essentially no planar area of the display panel 110 at which external force can be applied to separate the display panel 110 from the window 120. Thus, separation of the display panel 110 from the window 120 by directly applying force to the display panel 110 may be difficult. However, in one or more embodiment of a disassembling and remanufacturing method of a display module, the defective display panel 110 may be separated from the window 120 by using the auxiliary sheet 210 which can apply the external force to the display panel 110. Accordingly, the display module 100 may be disassembled into the separated components of the display panel 110 and the window 120.

Referring to FIG. 9, the adhesive layer 130 remaining attached to the window 120 is removed such as by a cleaning process. The removal of the adhesive layer 130 may expose an outer surface of the window 120 at which a non-defective display panel may be attachable. As shown in FIG. 9, the window 120 and a new display panel 110a different from the display panel 110 are attached with a new adhesive layer 130a different from the adhesive layer 130.

As described above, the display panel 110 which is defective can be separated from the window 120 and the new display panel 110 can be attached to the window 120 by one or more embodiment of the disassembling and remanufacturing method of the display module 100.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A disassembling method of a display module, comprising:
attaching an auxiliary sheet to the display module by using an adhesive tape, wherein the display module includes a display panel attached to a window by an adhesive layer, and
the auxiliary sheet attached to the display module includes an external force applying portion exposed outside an outer edge of the display module;
cooling the display module having the auxiliary sheet attached thereto; and
after the cooling of the display module having the auxiliary sheet attached thereto, separating the display panel and the window from each other by applying force to the external force applying portion of the auxiliary sheet attached to the display module,
wherein
the external force applying portion is a portion of the auxiliary sheet that does not overlap the window, and
an external force is applied according to a direction perpendicular to an upper surface of the auxiliary sheet.

2. The disassembling method of the display module of claim 1, wherein:
in the cooling of the display module having the auxiliary sheet attached thereto, the adhesive tape and the adhesive layer are each cooled to a temperature of about −80 degrees Celsius to about −120 degrees Celsius, and
the auxiliary sheet includes a metal material.

3. The disassembling method of the display module of claim 2, wherein a bonding force of the adhesive tape at the temperature of about −80 degrees Celsius to about −120 degrees Celsius is stronger than a bonding force of the adhesive layer at the temperature of about −80 degrees Celsius to about −120 degrees Celsius.

4. The disassembling method of the display module of claim 3, wherein the attaching of the auxiliary sheet to the display module includes attaching the auxiliary sheet to the window of the display module by using the adhesive tape.

5. The disassembling method of the display module of claim 4, wherein a planar area of the auxiliary sheet is larger than a planar area of the window to which the auxiliary sheet is attached.

6. The disassembling method of the display module of claim 5, wherein in the separating of the display panel and the window from each other, the adhesive layer remains attached to the display panel.

7. The disassembling method of the display module of claim 3, wherein the attaching of the auxiliary sheet to the display module includes attaching the auxiliary sheet to the display panel of the display module by using the adhesive tape.

8. The disassembling method of the display module of claim 7, wherein a planar area of the auxiliary sheet is larger than a planar area of the display panel to which the auxiliary sheet is attached.

9. The disassembling method of the display module of claim 8, wherein in the separating of the display panel and the window from each other, the adhesive layer remains attached to the window.

10. A remanufacturing method of a display module, comprising:
providing the display module by attaching a display panel to a window by an adhesive layer;
attaching an auxiliary sheet to the display panel or the window of the display module, by using an adhesive tape, the auxiliary sheet attached to the display module including an external force applying portion exposed outside an outer edge of the display module;
cooling the display module having the auxiliary sheet attached thereto;
after the cooling of the display module having the auxiliary sheet attached thereto, separating the display panel and the window from each other by applying force to the external force applying portion of the auxiliary sheet attached to the display panel or the window; and
removing the adhesive layer from one of the display panel and the window to which the auxiliary sheet is not attached,
wherein
a remanufactured display module includes the display panel or the window to which the auxiliary sheet is attached,
the external force applying portion is a portion of the auxiliary sheet that does not overlap the window, and
an external force is applied according to a direction perpendicular to an upper surface of the auxiliary sheet.

11. The remanufacturing method of the display module of claim 10, wherein:
in the cooling of the display module and the auxiliary sheet attached thereto, the adhesive layer and the adhesive tape are each cooled to a temperature of about −80 degrees Celsius to about −120 degrees Celsius, and
the auxiliary sheet includes a metal material.

12. The remanufacturing method of the display module of claim 11, wherein a bonding force of the adhesive tape at the temperature of about −80 degrees Celsius to about −120 degrees Celsius is stronger than a bonding force of the adhesive layer at the temperature of about −80 degrees Celsius to about −120 degrees Celsius.

13. The remanufacturing method of the display module of claim 12, wherein the attaching of the auxiliary sheet to the display panel or the window of the display module includes attaching the auxiliary sheet to the window by using the adhesive tape.

14. The remanufacturing method of the display module of claim 13, wherein a planar area of the auxiliary sheet is larger than a planar area of the window to which the auxiliary sheet is attached.

15. The remanufacturing method of the display module of claim 14, wherein in the separating of the display panel and the window from each other, the adhesive layer remains attached to the display panel.

16. The remanufacturing method of the display module of claim 15, wherein in the removing of the adhesive layer, the adhesive layer which remains attached to the display panel is removed therefrom,
further comprising after the removing of the adhesive layer from the display panel, attaching a new window to the display panel from which the adhesive layer is removed, by using a new adhesive layer.

17. The remanufacturing method of the display module of claim 12, wherein the attaching of the auxiliary sheet to the display module includes attaching the auxiliary sheet to the display panel by using the adhesive tape.

18. The remanufacturing method of the display module of claim 17, wherein a planar area of the auxiliary sheet is larger than a planar area of the display panel to which the auxiliary sheet is attached.

19. The remanufacturing method of the display module of claim 18, wherein in the separating of the display panel and the window from each other, the adhesive layer remains attached to the window.

20. The remanufacturing method of the display module of claim 19, wherein in the removing of the adhesive layer the adhesive layer which remains attached to the window is removed therefrom,
further comprising after the removing of the adhesive layer from the window, attaching a new display panel to the window from which the adhesive layer is removed, by using a new adhesive layer.

* * * * *